United States Patent
Sack

[11] 3,897,962
[45] Aug. 5, 1975

[54] GAS GENERATOR NOZZLE

[75] Inventor: John J. Sack, Bloomfield Hills, Mich.

[73] Assignee: Allied Chemical Corporation, New York, N.Y.

[22] Filed: June 20, 1973

[21] Appl. No.: 371,794

Related U.S. Application Data

[63] Continuation of Ser. No. 124,705, March 16, 1971, abandoned.

[52] U.S. Cl. ................ 280/150 AB; 239/265.15
[51] Int. Cl. .................................... B60r 21/08
[58] Field of Search .............. 280/150 AB; 138/45; 60/265; 23/281; 239/265.15

[56] References Cited
UNITED STATES PATENTS

| | | | |
|---|---|---|---|
| 2,940,251 | 6/1960 | Prentiss | 239/534 X |
| 3,079,111 | 2/1963 | Thorp | 244/122 |
| 3,141,477 | 7/1964 | Campbell et al. | 138/45 |
| 3,464,208 | 9/1969 | Martens | 60/265 |
| 3,558,285 | 1/1971 | Ciccone et al. | 23/281 |
| 3,655,217 | 4/1972 | Johnson | 280/150 AB |
| 3,692,495 | 9/1972 | Schneiter et al. | 23/281 |
| 3,733,180 | 5/1973 | Heineck et al. | 280/150 AB X |

*Primary Examiner*—Kenneth H. Betts
*Attorney, Agent, or Firm*—Jonathan Plaut; John P. Kirby, Jr.

[57] ABSTRACT

A nozzle provided in a gas generator to control gas flow generated by the combustion of a combustible material. The nozzle, disposed in the downstream end of the compartment containing the combustible material, is equipped to provide a constant volume of gas independent of thermodynamic conditions existing outside the generator. The nozzle is provided with an opening in the center to permit adequate gas flow at low ambient temperatures. Means are provided to enlarge this opening by increments at higher ambient temperatures so as to permit generation of gas at the same pressure regardless of the ambient temperature.

2 Claims, 5 Drawing Figures

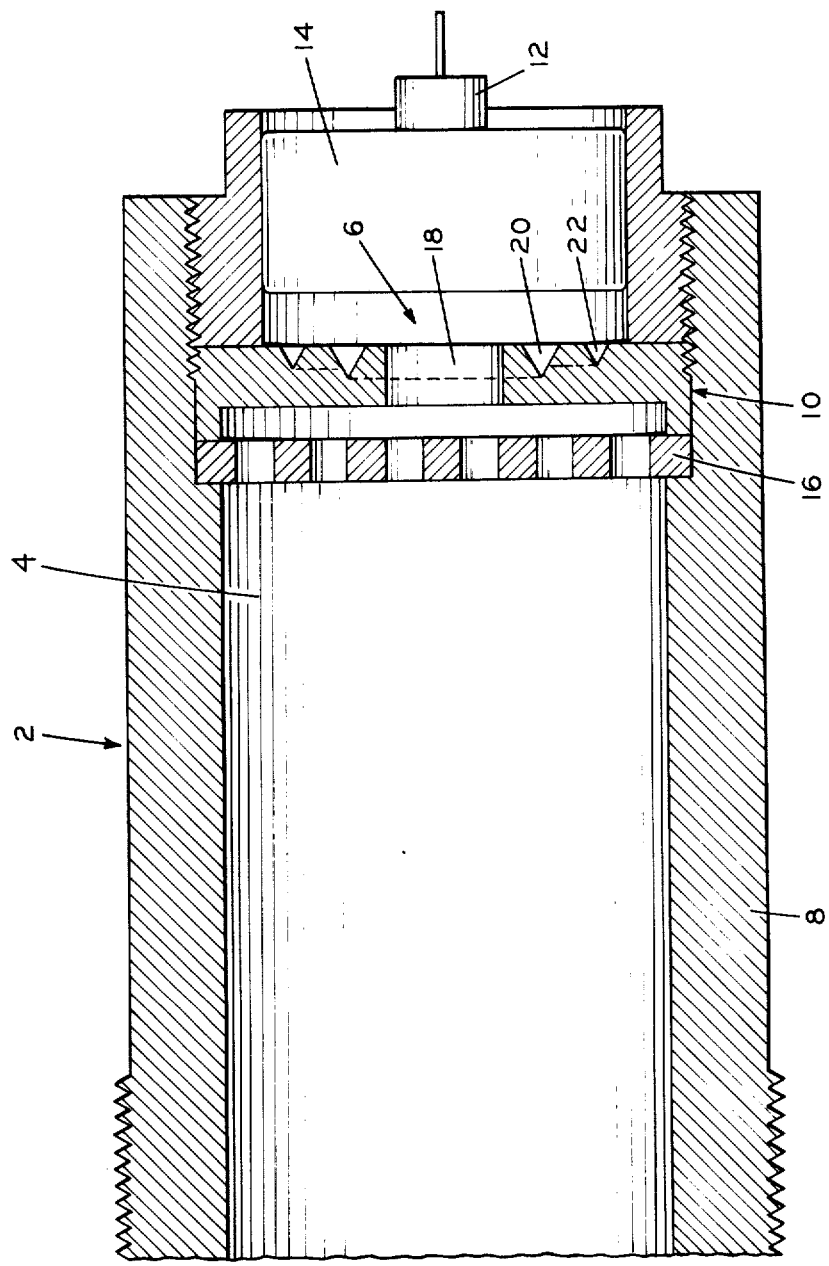

3,897,962

1
GAS GENERATOR NOZZLE

This is a continuation of application Ser. No. 124,705 filed Mar. 16, 1971, now abandoned.

BACKGROUND OF THE DISCLOSURE

The instant invention is directed to a variable nozzle for regulating gas flow from a gas generator. More specifically, the instant invention is directed to a nozzle which regulates gas flow so as to provide a constant output from a gas generator in which it is disposed regardless of the ambient temperature. Most specifically, the instant invention is directed to a nozzle provided in a gas generator, in communication with at least one gas bag, which permits constant gas output to inflate the gas bag regardless of the temperature surrounding the gas generator.

It has been proposed to provide motor vehicles with a passive restraint system, to protect occupants of a vehicle involved in an impact, rather than the presently employed seat belt restraint system. Although the combination of a lap belt and a shoulder harness provide excellent protection against injury due to vehicle impacts, their use requires a voluntary act on the part of the occupant. Thus, this system has not always provided the protection that it is capable of providing. A passive system, on the other hand, does not depend on any positive act on the part of the occupants. Such a system restrains occupants without any positive act on their part.

The passive restraint system which has gained the greatest acceptance to date has been inflatable gas bags. These bags, which inflate immediately upon impact of the vehicle, are inflated by gas generators. A recent development in the gas generation art has markedly improved the efficiency of this restraint system. Combustible materials have been employed to generate large volumes of gas. This gas alone, or in combination with a source of stored gas, provides an inflator system of significantly lower weight and volume than the generators of the prior art.

In this so called "pyrotechnic" gas generator, a combustible material, which is light and takes up relatively small space, is ignited upon impact of the vehicle. The combustible material is chosen so that large volumes of a non-toxic gas are generated upon combustion of the material. The gas generated is directed into at least one gas bag downstream of and in communication with the gas generator.

A disadvantage of this combustion type generator has been the difficulty in maintaining a constant gas output to the gas bags. As those skilled in the art are aware, in order to generate gas a combustion reaction must occur under specified conditions. These conditions include an optimum pressure for gas generation. In order to provide this optimum pressure, the combustible material is constrained in a volume separated from the remainder of the generator by a nozzle. This nozzle usually takes the form of a plate provided with an opening in the center thereof. Upon ignition of the combustible material gases are generated which flow downstream into at least one gas bag by escaping through the opening. This opening is predesigned to provide a stream of gas at a predesigned pressure necessary to inflate the gas bags at a speed and to an extent necessary to restrain the occupant immediately after collision of the vehicle. In the prior art, the nozzle was designed with an unchangeable opening size. Thus, in the prior art, various nozzles, having different fixed opening sizes, had to be provided depending on the climatic conditions existing in the area where the gas generator is to be used. This results in added gas generator costs.

Alternatively, if a single sized orifice is designed based on an overall average temperature, say 70°F., to overcome this expense, very hot or very cold ambient temperatures may result in undesirable performance during gas bag inflation. For a fixed nozzle opening, designed for a temperature of about 70°F., ambient temperatures significantly lower than this temperature results in inflatable gas pressures below that necessary for adequate gas bag inflation. On the other hand, ambient temperatures markedly in excess of this temperature may result in inflatable gas pressures greater than those that can be withstood by the bag with the resultant bursting of the bag.

What is lacking, therefore, in the prior art, is a method and apparatus that regulates generated combustion gas within a predetermined pressure range for satisfactory gas bag inflation independent of the outside ambient temperature.

SUMMARY OF THE INVENTION

The instant invention is directed to a method and apparatus which regulates the flow of generated combustion gases from a gas generator to one or more gas bags in communication with the generator, independent of the ambient temperature existing outside the generator.

In accordance with the instant invention a nozzle is provided in a combustion compartment means of a gas generator. The combustion compartment means is provided with a combustible material and an ignition means to ignite said material. Upon impact or collision of the vehicle, the combustible material is ignited by the ignition means resulting in the combustion of the material. Large volumes of gas are thereby generated. The nozzle, which in a preferred embodiment is the form of a disc, is provided with an orifice in the center permitting the escape of the generated gases into the combustion chamber. Since the size of this orifice opening dictates the pressure buildup in the combustion compartment, the opening is designed to provide suitable pressure buildup for gas bag inflation at low nominal ambient temperatures. The nozzle is also provided with means to increase the size of the orifice as a function of pressure buildup in the combustion compartment means. Thus, at temperatures significantly higher than this low design temperature, the resultant pressure buildup results in an increase in the orifice size to lower the pressure to within the range for satisfactory gas bag inflation.

The means to increase the orifice opening size, as a function of pressure buildup in the combustion compartment means, in one preferred embodiment, constitutes at least one pressure sensitive failure point, preferably a circumferential groove, disposed about the orifice opening. Each groove defines an increasing sized opening corresponding to an increased combustion compartment means pressure. Each succeeding groove further away from the center is designed to yield at an increasing pressure to increase the orifice opening size. Thus, in this preferred embodiment pressure relief means are employed to increase nozzle orifice size.

In another preferred embodiment, the means to increase orifice size comprises a dished cavity, defining a variable thickness surrounding the orifice opening. Thus, this curved surface has a thickness of zero at the orifice and extends non-linearly until it reaches the maximum nozzle thickness. In this embodiment, the momentum of the gas emitting through the orifice causes erosion of the material immediately surrounding the opening thereby increasing the orifice size. This procedure is continued until the pressure in the chamber does not provide the emitting gas with sufficient momentum to further erode the nozzle to increase the orifice opening. This equilibrium condition occurs when the pressure in the combustion chamber means is within the range required for proper gas bag inflation.

BRIEF DESCRIPTION OF THE DRAWING

The instant invention may be better understood by reference to the accompanying drawings of which:

FIG. 1 is a sectional elevation view of a gas generator incorporating the combustion compartment nozzle of the instant invention;

DETAILED DESCRIPTION

Figure 4:
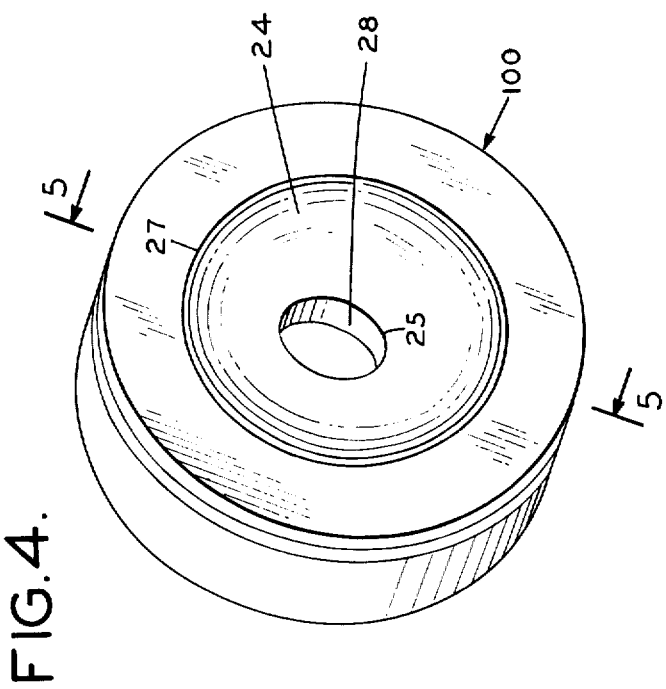
FIG. 4 is a perspective view of another preferred embodiment of the nozzle of the instant invention.

Turning to FIG. 1 in detail, a gas generator, generally indicated at 2, is provided with a combustion compartment means 6 disposed at the upstream end thereof. In a preferred embodiment, the gas generator 2 is cylindrically shaped. Thus the wall 8 of the generator resembles a closed-ended cylindrical tube.

Gas generator 2 is illustrative of gas generating means which employ a combination of stored pressurized gas with combustion generated gas to provide the gas necessary for gas bag inflation. It should be appreciated that the nozzle of the instant invention may also be provided in a gas generator which generates all its gas as the product of combustion of a combustible material.

Disposed at the downstream end of the combustion compartment means 6, is a nozzle 10 provided with an orifice 18 in the center thereof. The nozzle 10 is preferably constructed of a metal or strong plastic. The nozzle, of course, takes the shape of the shell 8. Thus, in a preferred embodiment, the nozzle 10 has a circular shape. The embodiment illustrated in FIG. 1 is provided with two concentric grooves 20 and 22 and is representative of the embodiment depicted in greater detail in FIGS. 2 and 3. Obviously, other embodiments employing another number of grooves may be substituted. Moreover, a nozzle of the type illustrated in FIGS. 4 and 5, to be described hereinafter, maybe similarly substituted.

FIG. 1 illustrates a typical environment for a combustion compartment means. A combustion compartment means, such as that illustrated at 6, comprises a combustible material 14 which, upon ignition, generates a large volume of non-toxic gas and a means to ignite the material 14. In one preferred embodiment, a high energy initiator such as a squib 12 is employed for this purpose. In order to help insure uniform inflation a diffuser 16 is also provided. The diffuser 16 is disposed downstream of the nozzle 10. Gas generator 2 includes a chamber 4 filled with a gas. Such a chamber is present in those generators employing a combination of stored and generated gas for gas bag inflation. The chamber 4 is not present in those generators which rely solely upon combustion generated gas.

Figure 2:
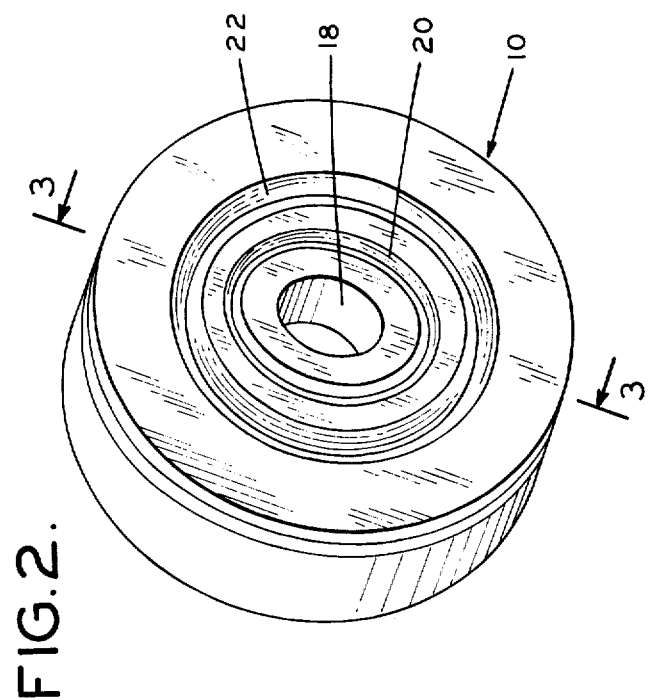
FIG. 2 is a perspective view of a preferred embodiment of the nozzle of the instant invention.
Figure 3:
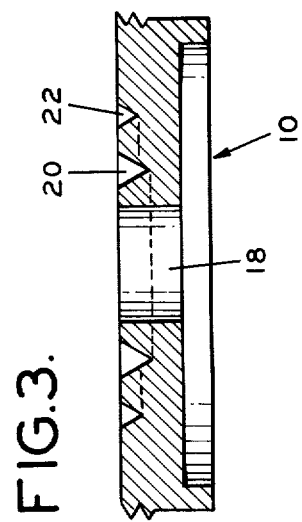
FIG. 3 is a sectional view taken along line 3—3 of FIG. 2.

Turning now to a more detailed description of the nozzle of the instant invention, attention is directed to FIGS. 2 and 3. In FIGS. 2 and 3, the nozzle 10 is shown provided with a pair of concentric grooves 20 and 22 spoken of above. It should be understood that any number of concentric grooves is within the scope of the instant invention. The sole limitation is that there be at least one concentric groove about the center orifice 18. The groove nearest the orifice 18, here groove 20, is widest and deepest. The second groove 22 is not as wide, nor as deep, as groove 20, but would be wider and deeper than a third groove further away from the orifice 18, if it were provided. This arrangement results in a plurality of increasingly strong grooves as a function of distance from the orifice 18. Those skilled in the art will devise other means to consecutively increase the strength of these concentric grooves. Thus, the invention should not be limited to increasingly narrower and shallower grooves. Such a method is but the most obvious way of providing increasingly more resistant failure points.

Figure 5:
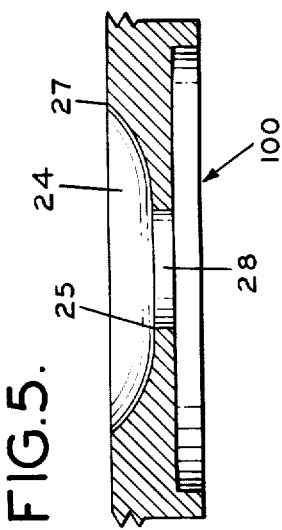
FIG. 5 is a sectional view taken along line 5—5 of FIG. 4.

A second preferred embodiment of the nozzle of the instant invention is illustrated by the nozzle 100 of FIGS. 4 and 5. Nozzle 100 is again provided with a center orifice, now designated by reference numeral 28. Surrounding orifice 28 is a dished cavity 24 defined by an inner edge 25 which corresponds to the outer edge of the orifice 28 and an outer edge 27 which is preferably concentric with the orifice 28. In one preferred embodiment the dished cavity 24 has a parabaloidal shape. Independent of the shape chosen, the dished cavity 24 is characterized by a cavity deepest adjacent to the inner edge 25 and shallowest adjacent the outer edge 27.

The material of construction of the nozzle is restricted to a material that erodes under the momentum of the exiting gas which emit through the orifice 28. Thus, any metal or strong plastic that erodes as a function of gas flow momentum may be employed. Aluminum has been found to be an excellent material in this regard and its use is preferred.

In operation, the nozzle 10 or 100 serves to constrain and emit gases generated by the combustion of combustible materials. These pyrotechnic materials, as combustible materials are often called, emit large volumes of gas upon ignition. However, the generation of large volumes of gas is not, of itself, all that is required for the proper inflation of gas bags. The gas, in addition, must be at specified pressure range in order to insure the proper rate of, and volume of, gas bag inflation. Pressure regulation is preferably performed by nozzles disposed in the downstream end of the combustion compartment. The instant invention follows this tradition. Control is based on the limited orifice opening in the nozzle which serves to restrict gas emission from the compartment at a rate that is equivalent to a predetermined range of pressure of the emitting gas. In the prior art, this nozzle was fixed so that extreme ambient conditions could not be considered. The original design would assume a temperature of the outside atmosphere and the orifice size would be calculated as a function of that temperature.

In the instant invention, the orifice is again sized as a function of an assumed temperature. However, instead of an average temperature calculated on the basis of the temperature that an average vehicle would encounter, this temperature is taken at the lowest temperature a vehicle would encounter. Thus, the nozzle size would be appropriate to a vehicle being used in cold climates. In warmer climates the higher ambient temperatures cause the pressure buildup in the combustion chamber means 6 to exceed the design gas pressure required for proper gas bag inflation. Instead of resulting in an improperly inflated gas bag, due to the invariability of the orifice, as in the prior art, the pressure is automatically decreased.

In nozzle 10 this decrease is effected primarily by the designed pressure relief means provided by the grooves. As the pressure is increased, as a function of ambient temperature, above the pressure created by the combustion reaction, the orifice 18 is increased in size by the successive failure of one or more grooves until the orifice 18 is increased in size so that the pressure in the combustion compartment means 6 is reduced to that required for proper gas bag inflation. For example, assume a vehicle is provided with a generator 2 which encounters a temperature range somewhat in excess of the temperature range for which orifice 18 is designed. As a result, the weakest groove, that is, the groove which fails at the lowest pressure loading, fails resulting in an enlargement of the orifice size to the size of the failing groove. Thus, in our hypothetical case, groove 20 yields, resulting in an enlargment of the opening to a size equivalent to the opening defined by groove 20. If the temperature is still higher, then groove 22 gives way. This process continues until the orifice opening is suitable to the climatic conditions existing in the area in which the vehicle is used. Of course, each groove or failure point is designed to fail at successive temperatures sufficiently in excess of one another so that the orifice size remains constant in a particular geographical area.

It should be apparent, also, that the invention is limited only by a minimum number of failure points or grooves. Thus, there must be one groove or failure point in addition to the orifice 18. The maximum of failure points is unlimited.

The nozzle 100 operates on the same principle, albeit a somewhat different mechanism is employed. In the case of nozzle 100, the dished cavity 24 around the orifice 28 provides an increasing thickness as a function of distance therefrom.

Again the orifice 28 is designed for the minimum ambient temperature range expected. Again, as the ambient temperature encountered is increased, the pressure in the combustion compartment means, such as at 6, is increased beyond the level acceptable for satisfactory gas bag inflation. Again, this results in enlargement of the opening of the orifice 28. However, in this case the primary mode of enlargement is the increased speed of the exiting gas. As those skilled in the art are aware, the velocity of an emitting fluid is proportional to the pressure of the exiting fluid, since this pressure provides the driving force. The increased momentum of this exiting gas stream causes erosion of the thinner portion of the dished cavity 24, so that the orifice size is enlarged. This procedure continues until the velocity of the exiting stream is decreased below that required for further erosion. This condition is reached when the pressure in the combustion chamber is equal to that required for satisfactory gas bag inflation.

In summary, the two embodiments employ the same principle of operation. However, one uses the mechanism of direct pressure relief of the combustion compartment while the other employs the effect of momentum of the exiting stream. Since this momentum is directly dependent upon the pressure in the combustion compartment, it is another form of pressure relief.

From the above description it is seen that the scope and spirit of the instant invention will make apparent other embodiments in addition to those described above. Therefore, the scope of the instant invention should be limited only by the appended claims.

What is claimed is:

1. In a gas generator for inflation of at least one bag including a combustion chamber means provided with a combustible material and an ignition means to ignite said combustible material to generate large volumes of gas, the improvement comprising a nozzle for regulating the gas flow into said gas bag, said nozzle provided with an orifice in the center thereof, said nozzle disposed in said combustion chamber means directly in the flow of said gas from said combustible material, prior to any other apparatus for treating said gas and prior to the passage of said gas through any other orifices, said nozzle provided with at least a first pressure sensitive failure point and a second pressure sensitive failure point, each of said failure points disposed on structure surrounding said orifice and being adapted to fail and thus to increase the orifice size, said first failure point disposed closer to the center of said orifice than said second failure point, said first failure point arranged to fail prior to said second failure point, the size of said orifice increasing gradually in a direction outward from the center of said orifice by removal of part of said structure and enlargement of the preexisting orifice as a function of the increased pressure in said combustion chamber means.

2. In a gas generator for inflation of at least one gas bag including a combustion chamber means provided with a combustible material and an ignition means to ignite said combustible material to generate large volumes of gas, the improvement comprising a nozzle regulating the gas flow into said gas bag disposed in said combustion chamber means, said nozzle provided with an orifice in the center thereof, said nozzle disposed in said combustion chamber means directly in the flow of said gas from said combustible material, prior to any other apparatus for treating said gas and prior to the passage of said gas through any other orifices, said nozzle provided with at least a first pressure sensitive failure point and a second pressure sensitive failure point, each of said failure points, disposed on structure surrounding said orifice and adapted to fail and increase the orifice size, said first failure point disposed closer to the center of said orifice than said second failure point, said first failure point arranged to fail prior to said second failure point, the size of said orifice thereby increasing gradually in a direction outward from the center of said orifice by removal of part of said structure and enlargement of the pre-existing orifice as a function of the increased pressure in said chamber means, said failure point comprising a groove circumferentially disposed about said orifice.

* * * * *